United States Patent
Yamamoto

[11] Patent Number: 5,803,861
[45] Date of Patent: Sep. 8, 1998

[54] TOROIDAL TYPE CONTINUOUSLY VARIABLE TRANSMISSION

[75] Inventor: Takeshi Yamamoto, Yokohama, Japan

[73] Assignee: Nissan Motor Co., Ltd., Kanagawa, Japan

[21] Appl. No.: 686,627

[22] Filed: Jul. 24, 1996

[30] Foreign Application Priority Data

Jul. 24, 1995 [JP] Japan .................................. 7-187240

[51] Int. Cl.6 .................................................. F16H 15/36
[52] U.S. Cl. ................................................. 476/40; 476/42
[58] Field of Search ........................ 476/40, 42; 384/461, 384/494

[56] References Cited

U.S. PATENT DOCUMENTS 5,368,529  11/1994  Machida ..................................... 476/40

FOREIGN PATENT DOCUMENTS 63-130953  6/1988  Japan .
402120548 A  5/1990  Japan ........................................ 476/40
404321854 A  11/1992  Japan ........................................ 476/40

Primary Examiner—Charles A. Marmor
Assistant Examiner—William C. Joyce
Attorney, Agent, or Firm—McDermott, Will & Emery

[57] ABSTRACT

The toroidal type continuously variable transmission includes a power roller which is pinched between confronting faces of an input disk and an output and which can be tilted, an input shaft which rotates together with the input disk, and an output gear which is coupled to the rear side of the output disk. Thrust and radial loads which are imposed upon the output disk are supported by an angular bearing which is provided on the other side of the output gear from the output disk. The input shaft penetrates through the output disk and the output gear so as to be freely rotatable with respect to them both, and a radial bearing is provided which supports load in the radial direction between an inner circumferential surface of the output gear and the input shaft. This radial bearing cooperates with the angular bearing, and thereby the strength for supporting radial loads upon the output gear is enhanced.

8 Claims, 6 Drawing Sheets

TOROIDAL TYPE CONTINUOUSLY VARIABLE TRANSMISSION

FIELD OF THE INVENTION

This invention relates to a toroidal type continuously variable transmission which is used in an automobile or the like.

BACKGROUND OF THE INVENTION

A toroidal type continuously variable transmission which was disclosed in Tokkai Sho 63-130953 published by Japanese Patent Office in 1988 is constructed as shown in FIG. 4.

In detail, an input disk 1 and an output disk 2 whose confronting faces together define a toroidal space are provided coaxially with an input shaft 4, and any desired speed change ratio can be obtained in a continuously variable (stepless) manner by varying the angle of inclination of a pair of power rollers 3 which are fitted between these disks in this toroidal space and which have part spherical driving surfaces which bear against the confronting faces of the input disk 1 and the output disk 2.

A cam flange 11 is fixed to the input shaft 4, and cam rollers 12 are arranged between this cam flange 11 and the input disk 1, and the input disk 1 is supported via a radial bearing 7 upon the Input shaft 4 so as to rotate freely.

The input shaft 4 is supported via an angular ball bearing 6 in a casing 10 so as to rotate freely. This angular ball bearing 6 supports both thrust loads and radial loads to which the input shaft 4 is subjected.

An output gear 13 is engaged to the output disk 2. The output disk 2 and the output gear 13 are supported by an angular ball bearing 5. This angular ball bearing 5 is provided between the output gear 13 and the casing 10, and supports thrust loads and radial loads to which the output gear 13 is subjected. A radial bearing 8 which is constructed as a needle bearing is provided between the output disk 2 and the input shaft 4, so that the output disk 2 and the shaft 4 can rotate relative to each other.

The angular ball bearings 5 and 6 are provided coaxially and adjacent to one another.

In order to prevent the radial bearing 8 from dropping out from the output disk 2, a snap ring 21 is fitted into a ring groove 23 which is cut into the inner cylindrical surface 2A of a central axial hole provided through the output disk 2, as shown in FIG. 5.

When the rotation of the input shaft 4 is stopped, a power rollers 3 which is provided between the input disk 1 and the output disk 2 is supported by being squeezed between them, due to the force of compression of a dish spring 9 which is provided at the end portion of the input shaft 4 at the side of the output disk 2, i.e. at its right end as seen in FIG. 4, and which biases the input shaft 4 in the rightwards direction as seen in the figure.

On the other hand, when the input shaft 4 rotates the cam flange 11 which is fixed to this input shaft 4 also rotates, and therefore the cam rollers 12 are rotated due to this rotation of the cam flange 11 relative to the input disk 1 which is supported via the radial bearing 7 by the input shaft 4 so as to rotate freely with respect thereto. Due to this, the cam surfaces of the cam rollers 12 press the input disk 1 in the direction of the output disk 2 with a strong pressing force, and under the action of this pressure the input disk 1 and the input shaft 4 are caused to rotate together.

Since the power rollers 3 is pinched by this strong pressure between the input disk 1 and the output disk 2, it rotates without slipping against either of these members, and accordingly it transmits torque from the input disk 1 to the output disk 2. The rotational speed ratio between the input disk 1 and the output disk 2 can be continuously (steplessly) varied by altering the inclination of the central axes of the power rollers 3 via the operation of an actuator, not particularly shown in the figure.

A gear 14, which is coupled with a drive shaft not shown in the figure, is meshed with the output gear 13. The torque which as described above is transmitted to the output disk 2 is transmitted via the output gear 13 which rotates together therewith and then via the gear 14 to this drive shaft. A certain predetermined gap 22 is provided between the rear surface 2B of the output disk 2 and the side face of the output gear 13 which opposes it. This is provided so that, even if the high pressure which is exerted via the power rollers 3 by the cam rollers 12 upon the output disk 2 causes it to be somewhat deformed, this will not cause any load to be imposed upon the output gear 13.

With this toroidal type continuously variable transmission, the bearing which supports the output disk 2 and the output gear 13 which rotate together is constituted by the angular ball bearing 5 which supports both thrust loads and also radial loads and the radial bearing 8 which supports only radial loads.

In this connection, in order to calculate the loads which act upon these bearings, let the points of intersection with the central axis of the input shaft 4 of the lines of operation of the forces in the radial direction which act upon the radial bearing 8 and upon the output gear 13 respectively be termed Q and R, as shown in FIG. 5, and let the distance between these points Q and R along the axial direction of the shaft 4 be termed a. In the following explanation, these points Q and R will simply be termed the points of operation of the respective members.

The angular ball bearing 5 transmits thrust load which it receives from the power rollers 3 and radial load which it receives from the output gear 13 from its inner race 5A via its outer race 5B to the casing 10, and the casing 10 supports these loads. If the angle of contact of this angular ball bearing 5 is termed θ, then the line of operation of the force which acts upon the angular ball bearing 5, as shown in FIG. 5, intersects the central axis of the input shaft 4 at a point P which is more towards the side of the input disk 1 than the point of operation Q of the load upon the radial bearing 8. Let the distance along the central axis of the input shaft 4 between this point of operation P and the point of operation R of the output gear 13 be termed b, and, in the same manner, let the distance along this central axis between the point of operation P and the point of operation Q of the radial bearing 8 be termed c.

When a force Kin the radial direction operates upon the output gear 13 due to the meshing between this output gear 13 and the gear 14, the following equations hold between this force K, the radial load $F_o$ which operates upon the angular ball bearing 5, and the radial load $F_r$ which operates upon the radial bearing 8:

$$F_o = \frac{K \cdot a}{c} \quad (1)$$

$$F_r = \frac{K \cdot b}{c} \quad (2)$$

Since the distance c, as shown in FIG. 5, has a very small value in comparison with the distances a and b, the loads $F_o$ and $F_r$ as calculated by the above equations have large values. In other words, when a load in the radial direction operates upon the output gear 13 due to its engagement with the gear 14, this generates large loads which operate upon the angular ball bearing 5 and upon the radial bearing 8. For this reason, this transmission suffers from the problem that the service life of the bearings incorporated therein is relatively short.

Further, with this transmission, when the output disk 2 exerts a load in a direction angled with respect to the output gear 13, this load is mainly borne by the angular ball bearing 5 alone. Due to this, if this bearing 5 does not possess sufficient support strength, as a result there is a tendency for the gear noise to become unduly large, and for the service life of the faces of the gears to be unduly short.

Yet further, due to the provision of the gap 22 between the output disk 2 and the output gear 13, if the output disk 2 becomes deformed due to the force which is exerted by the power rollers 3, the stress which is entailed is concentrated in the ring groove 23 which receives the snap ring 21, and this portion can easily become damaged. Moreover, when this output disk 2 is thus deformed, its inner cylindrical portion 2A may become deformed into an elliptical shape as shown in FIG. 6, and this will mean that the local load upon the radial bearing 8 is increased, whereby the service life of the radial bearing 8 will be still further shortened.

SUMMARY OF THE INVENTION

It is therefore an object of this invention to strengthen the support structure of the output gear in the toroidal type continuously variable transmission.

It is a further object of this invention to reduce the load which is imposed upon the bearings in the toroidal type continuously variable transmission.

It is still a further object of this invention to prevent deterioration of the various elements of the toroidal type continuously variable transmission caused by deformation of the output disk thereof.

In order to achieve the above objects, this invention provides a toroidal type continuously variable transmission adapted to be interposed between an input shaft and a drive shaft for transmitting a rotation of said input shaft to the drive shaft at any rotational speed ratio within a continuous range. The transmission comprises an input disk supported on the input shaft so as to rotate together with the input shaft, an output disk supported on the input shaft so as to be free to rotate on the input shaft, a toroidal cavity formed in confronting faces of the input and output disks, a roller member fitted into the toroidal cavity and having a part spherical rolling surface; a mechanism for mutually biasing together the input and output disks so as to contact both of their confronting faces against the part spherical rolling surface of the roller member and to support the roller member within the toroidal cavity; a first output gear disposed on the other side of the output disk from the input disk and coupled to the output disk; a second output gear meshed with the first output gear for transmitting driving force to the drive shaft; an angular bearing disposed on the other side of the first output gear from the output disk and supporting a thrust load and a radial load imposed upon the output disk; and a radial bearing provided between an inner circumference of the first output gear and the input shaft for supporting a radial load imposed upon the first output gear.

It is preferable that a central position of the radial bearing is located between a central position of the angular bearing and a central position of the first output gear along a central axis of the input shaft.

It is further preferable that the location of the radial bearing along the input shaft is defined by the following relations:

a<c and b<c a=$\overline{RQ}$, b=$\overline{PR}$, c=$\overline{PQ}$ where P is a point of intersection between a line of operation of a support force of the angular bearing based upon an angle of contact θ of the angular bearing and a central axis of the input shaft, R is a point of intersection between a line of operation of the radial load imposed upon the first output gear and the central axis of the input shaft, and Q is a point of intersection between a line of operation of a support force of the radial bearing and the central axis of the input shaft.

According to another aspect of this Invention, the first output gear comprises a hollow shaft which protrudes in a direction of the input disk and penetrates through the output disk, and the radial bearing is disposed between the input shaft and an inner circumference of an end portion of the hollow shaft which has penetrated through the output disk.

In this case, it is preferable that a gap is present between the hollow shaft and an inner circumference of the output disk.

It is further preferable that the device further comprises a mechanism for preventing the radial bearing from dropping out from the first output gear.

The details as well as other features and advantages of this invention are set forth in the remainder of the specification and are shown in the accompanying drawings.

DESCRIPTION OF THE PREFERRED EMBODIMENTS

Figure 1:
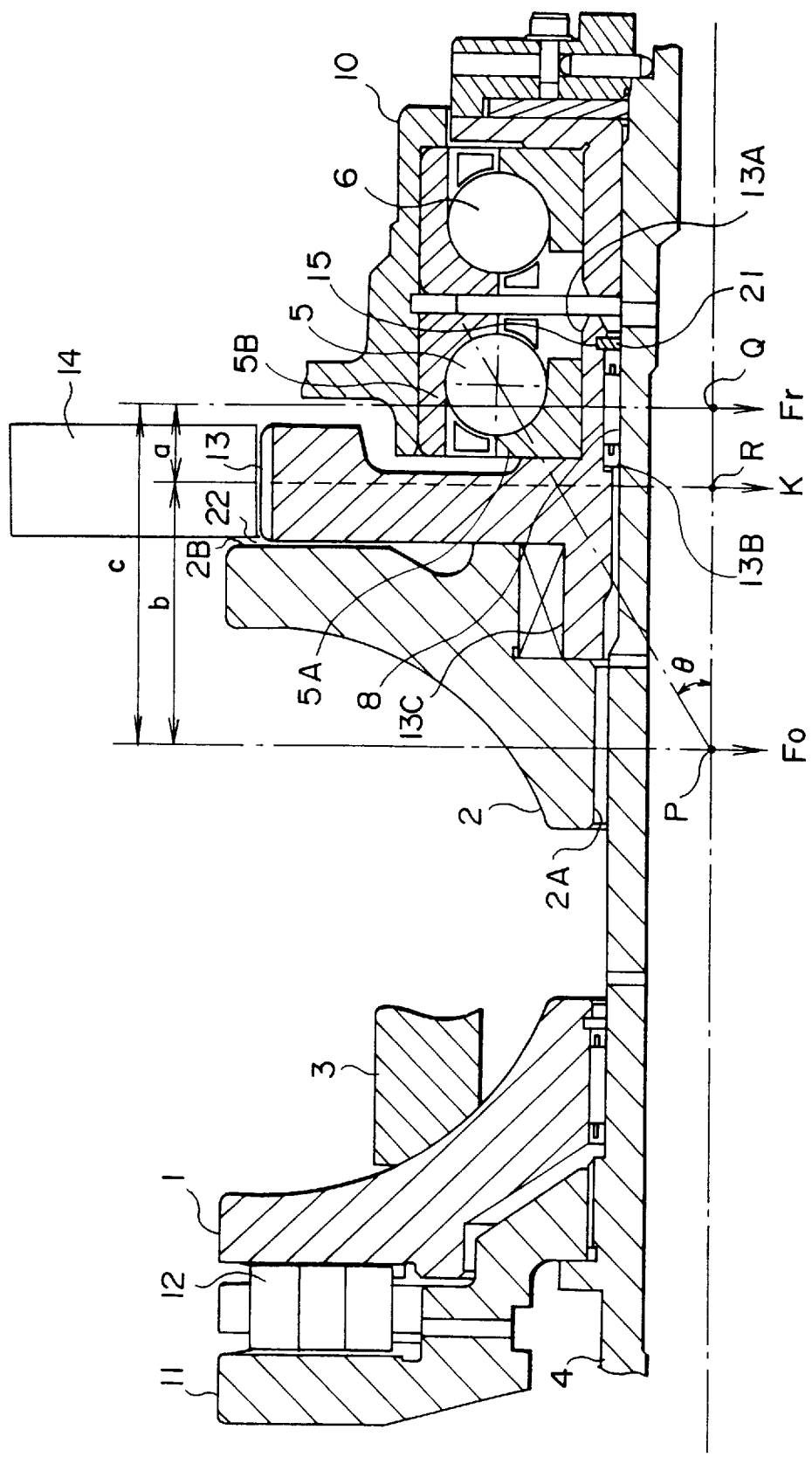
FIG. 1 is a vertical sectional view of essential portions of a toroidal type continuously variable transmission according to this invention.

Referring to FIG. 1 of the drawings, the output gear 13 comprises hollow shafts 13A and 13C of predetermined lengths. The hollow shaft 13A is engaged with the inner race 5A of the angular ball bearing 5, while the hollow shaft 13C is engaged with the inner cylindrical surface portion 2A of the output disk 2.

The input shaft 4 passes through the central holes in the hollow shafts 13A and 13C, and a radial bearing 8 is fitted between the inner cylindrical surface 13B of the hollow shaft 13A and the outer cylindrical surface of the input shaft 4. This radial bearing 8 is a needle bearing, and supports radial loads which are imposed upon the output gear 13.

A ring groove 15 is formed in the end portion of the inner cylindrical surface 13B of the hollow shaft 13A, and a snap ring 21 is inserted into this ring groove 15.

The snap ring 21 is engaged with this ring groove 15 and prevents the radial bearing 8 from dropping out from the hollow shaft 13A.

The radial bearing 8 is positioned along the axial direction of the input shaft 4 so that its central transverse plane is on the side of the central transverse plane of the output gear 13 towards the central transverse plane of the angular bearing 6, i.e. is on the right side thereof in FIG. 1. If this radial bearing 8 is a ball bearing, then this means that the centers of the balls thereof should lie on the side of the output gear 13 towards the angular bearing 6.

Figure 5:
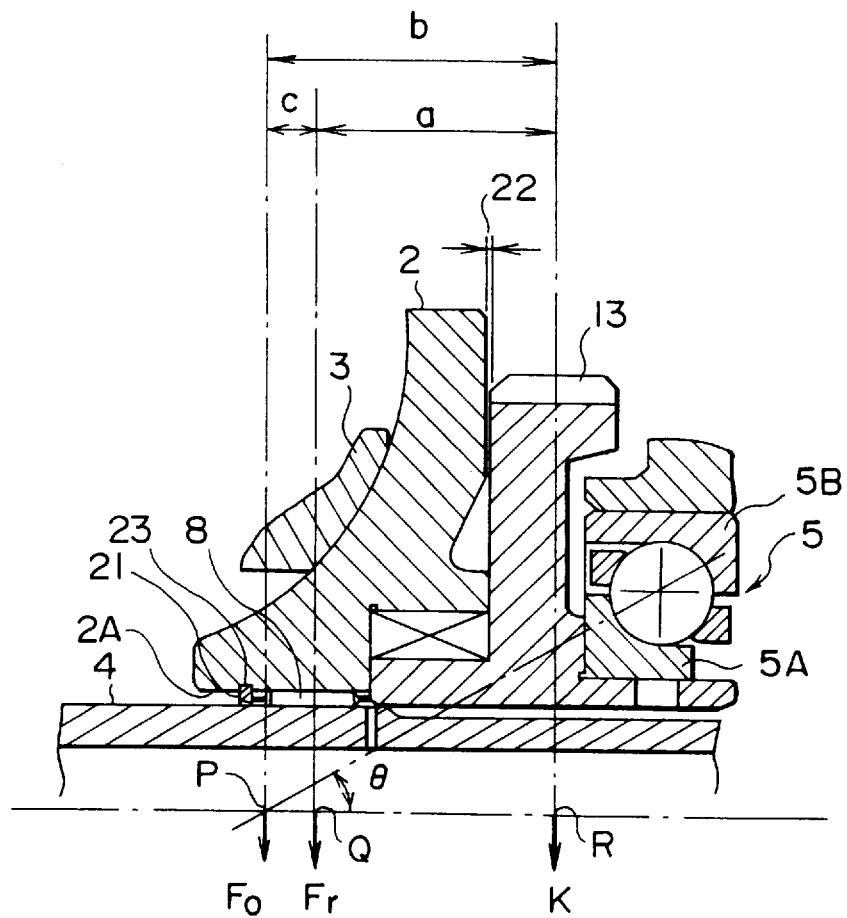
FIG. 5 is an enlarged view of a portion of the FIG. 4.

In detail, the plane which is perpendicular to the central axis of the input shaft 4 and which passes through the center of the width of the gear teeth of the output gear 13 agrees with the line of operation of the load in the radial direction which operates upon the output gear 13 due to its engagement with the gear 14 shown in FIG. 5, and this central plane intersects the central axis of the input shaft 4 at a point of operation R.

The line of operation of the load in the radial direction which operates upon the radial bearing 8 passes through the center of the radial bearing 8, and intersects the central axis of the input shaft 4 in the point Q. This point of operation Q is positioned on the side of the point of operation R of the load on the output gear 13 towards the angular bearing 6.

The point of intersection P of the line of operation of the load on the angular ball bearing 5 and the central axis of the input shaft 4 is the same as in the prior art described above. As a result, the distance c between the points of operation P and Q is greater than the distance a between the points of operation R and Q, and is also greater than the distance b between the points of operation R and P.

Figure 4:
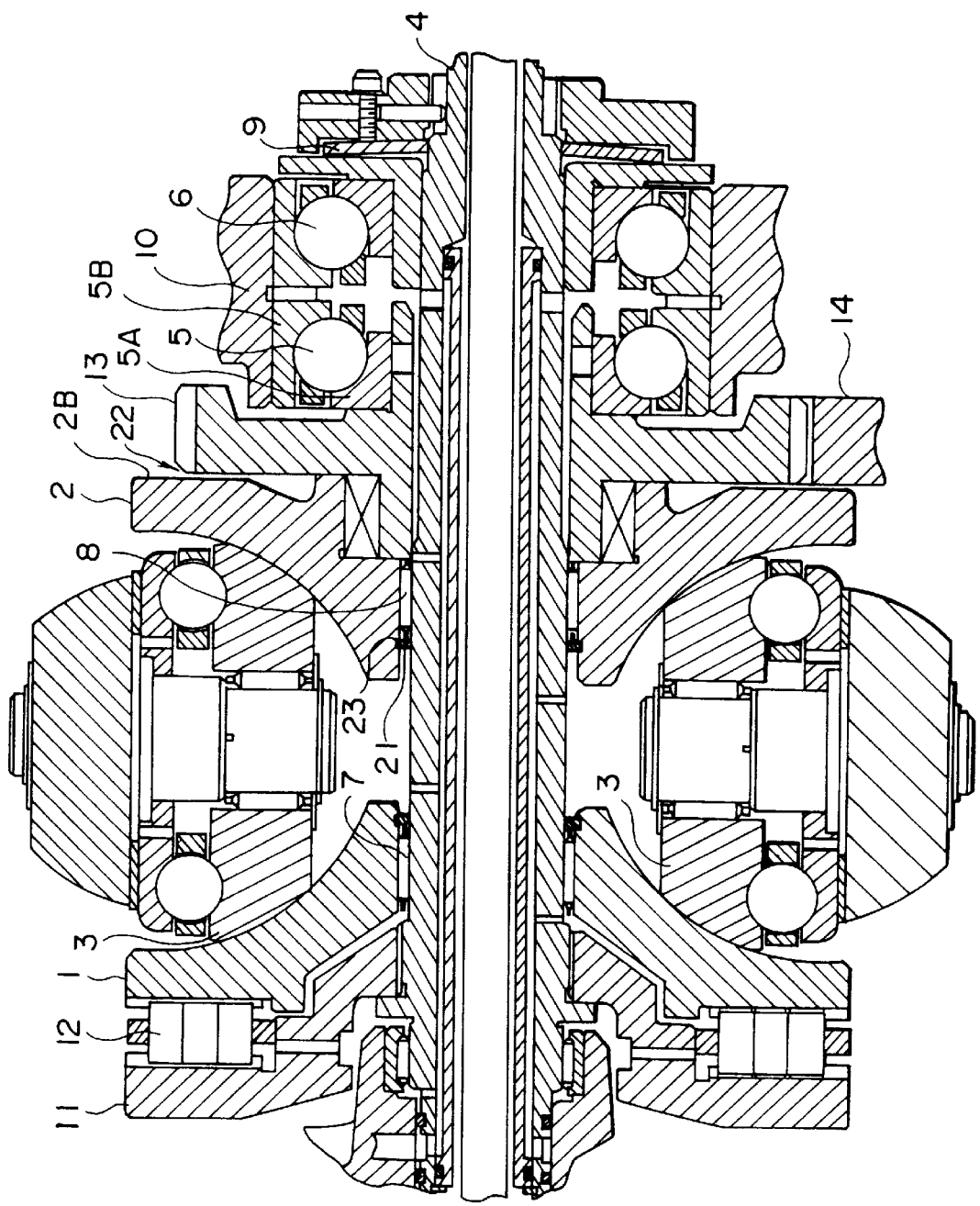
FIG. 4 is a vertical sectional view of essential portions of a toroidal type continuously variable transmission according to a prior art.
Figure 6:
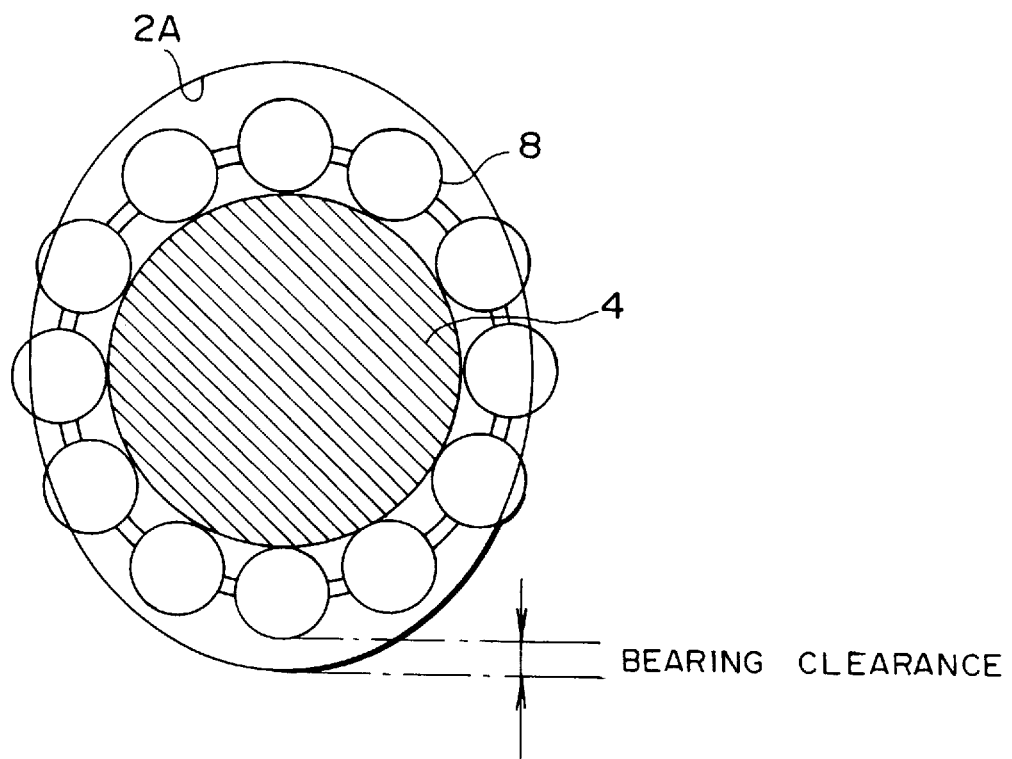
FIG. 6 is a diagram showing how an output disk is deformed under stress in the prior art device.

No ring groove like the ring groove which was provided in the prior art is provided on the inner cylindrical surface 2A of the output disk 2; instead, this surface 2A is formed as a smooth cylindrical surface. The remainder of the construction of this transmission is the same as that of the prior art transmission which was shown in FIGS. 4 through 6 and described above.

Also in the case of this transmission, when the input shaft 4 is rotated, torque is transmitted from the input disk 1 via the power rollers 3 to the output disk 2, and the output disk 2 rotates together with the output gear 13 as one body, so that this torque is transmitted to the output gear 13 and thence to the gear 14 which is meshed with it.

At this time, the thrust which the power rollers 3 exert upon the output disk 2 is borne by the angular ball bearing 5, while the force K in the radial direction due to the meshing engagement between the output gear 13 and the gear 14 is borne by the radial bearing 8 and the angular ball bearing 5.

The loads $F_o$ and $F_r$ in the radial direction which are imparted to the angular ball bearing 5 and to the radial bearing 8 can be calculated from the above equations (1) and (2), and since the distances between the above described points of operation satisfy a<c and b<c, these loads $F_o$ and $F_r$ in the radial direction which are imparted to the angular ball bearing 5 and to the radial bearing 8 are relatively small, in comparison to their values for the prior art transmission described above. This brings about the beneficial result that the durability and service life of the angular ball bearing 5 and of the radial bearing 8 are enhanced.

Further, since the radial bearing 8 directly supports the output gear 13, the strength by which the output gear 13 is supported against tilting positional displacement is increased, and thereby gear noise is suppressed and also the durability of the gear wheels is enhanced.

Yet further, since the groove for receiving the snap ring 21 is formed in the output gear 13, and accordingly the ring groove is eliminated from the output disk 2, therefore there is no question of stress being concentrated in such a ring groove, even if the output disk 2 is distorted by the pinching support pressure which it exerts upon the power rollers 3.

The gap 22 which is provided between the output gear 13 and the output disk 2 prevents distortion of the output disk 2 being transmitted to the output gear 13. Since in this case the radial bearing 8 supports the output gear 13 instead of being required to support the output disk 2 whose distortion is great, accordingly even if the output disk 2 is distorted no local load is exerted upon the radial bearing 8. As a result of this the radial bearing 8 is not subjected to undue wear, and accordingly its durability is high, as is desirable.

Figure 2:
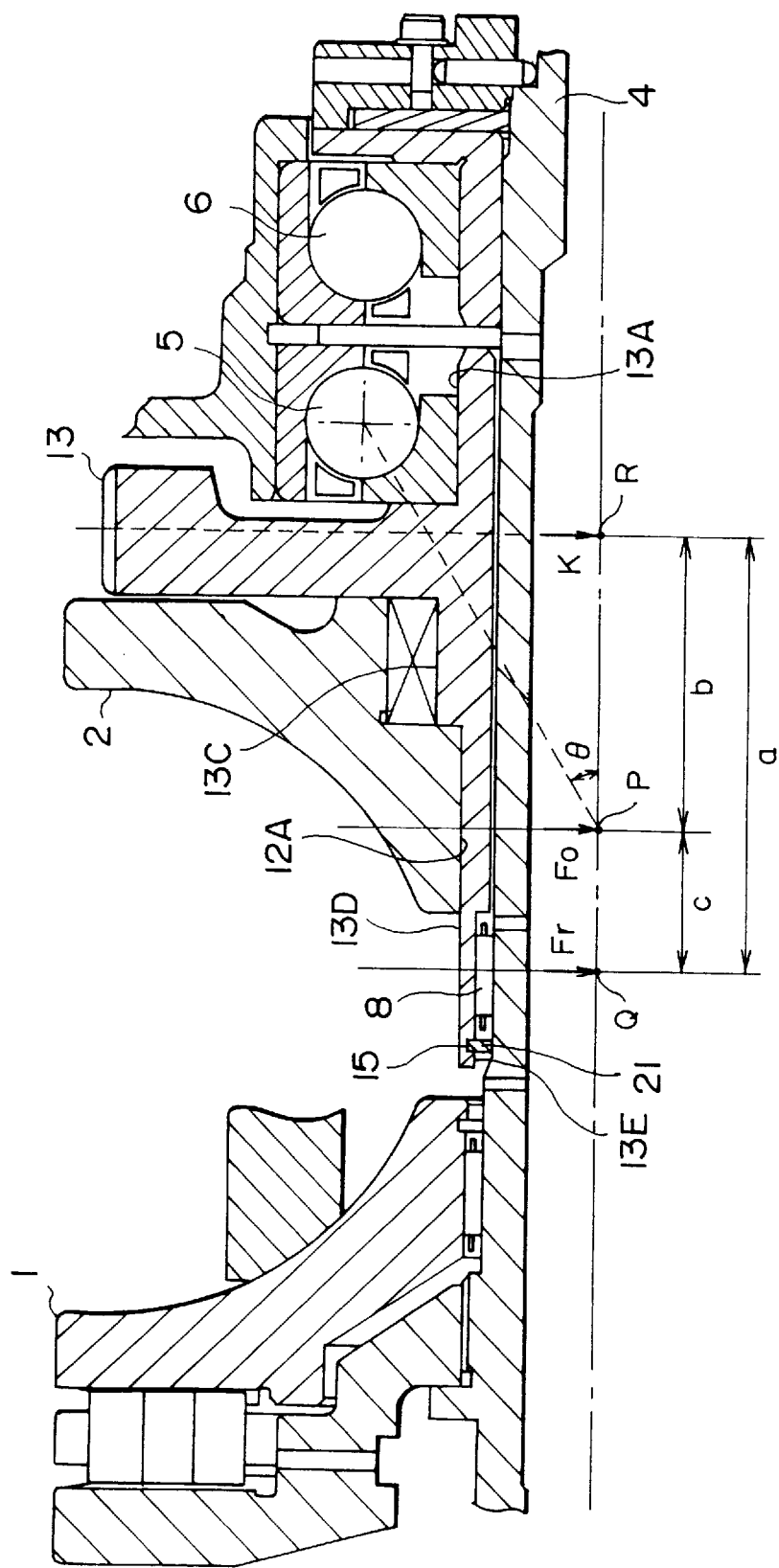
FIG. 2 is similar to FIG. 1, but showing a second embodiment of this invention.

FIG. 2 shows a second embodiment of this invention.

In this second embodiment, the hollow shaft 13C of the output gear 13 is formed with an extended portion 13D which passes through the output disk 2 and extends therefrom in the direction of the input disk 1. A predetermined gap is left between the end portion of this extended portion 13D and the input disk 1.

Further, the radial bearing 8 is provided between the inner cylindrical surface 13E of the extended portion 13D and the outer cylindrical surface of the input shaft 4. Moreover, the ring groove 15 in which the snap ring 21 is fitted is formed in the inner cylindrical surface 13E of the extended portion 13D. By doing this, the radial bearing 8 and the snap ring 21 are positioned more towards the input disk 1 than the output disk 2.

The axial position of the radial bearing 8 is set so that the point of operation Q comes more towards the input disk 1 than the point of operation P. Also in this case, it is possible to set the distance c between the points of operation Q and P larger as compared with the prior art, and the radial loads $F_r$ and $F_o$ which are applied to the radial bearing 8 and to the angular ball bearing 5 can be therefore made smaller.

Yet furthermore, since the angular ball bearing 5 and the radial bearing 8 are arranged on opposite sides of the output gear 13, the support in the radial direction of the output disk 2 is made more stable.

Figure 3:
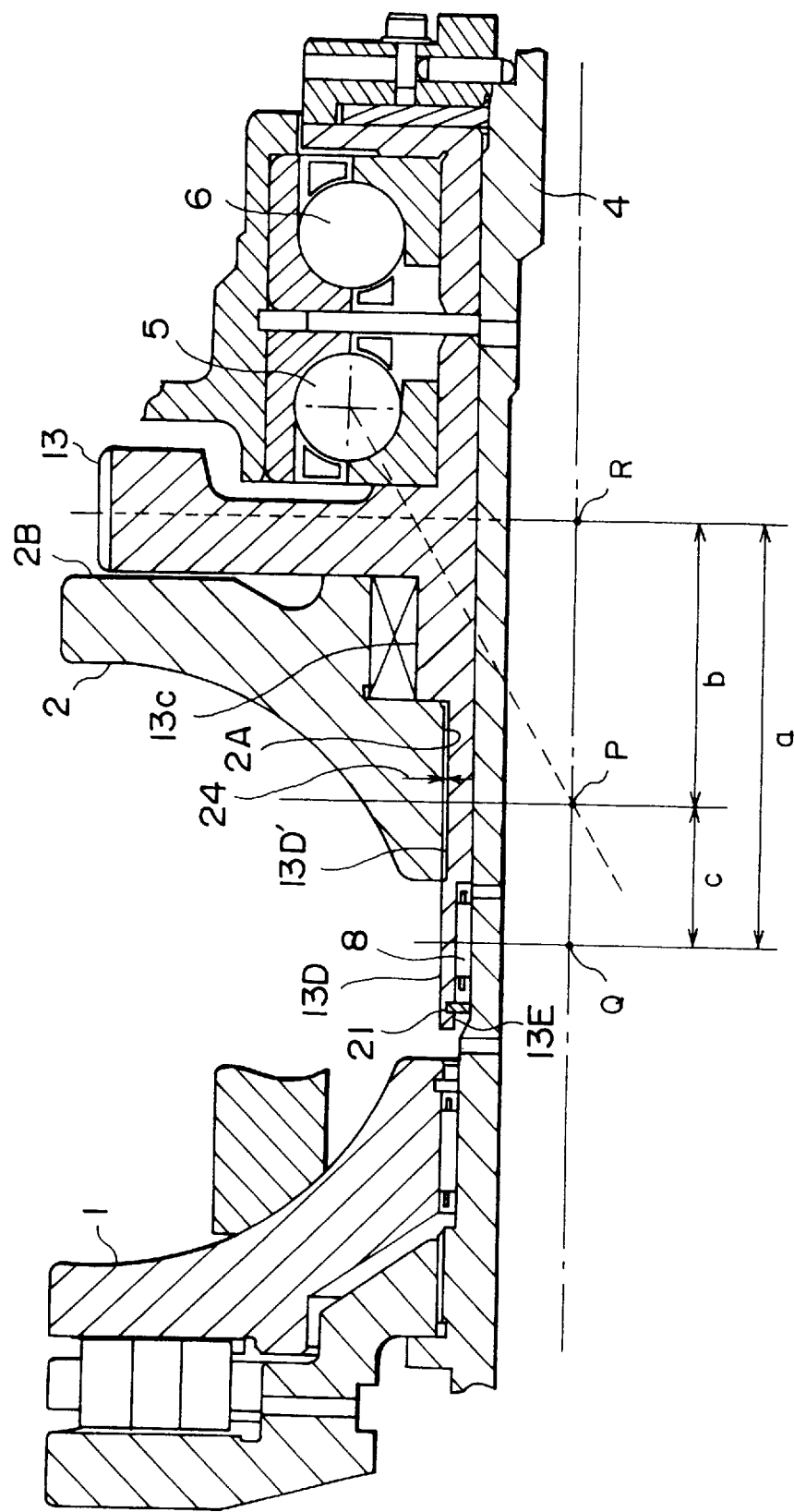
FIG. 3 is similar to FIGS. 1 and 2, but showing a third embodiment of this invention.

FIG. 3 shows a third embodiment of this invention.

In this third embodiment, in addition to the mechanisms of the second embodiment, also the portion of the outer cylindrical surface of the extended portion 13D which lies inside the inner cylindrical surface of the output disk 2 is formed as a portion 13D' whose external radius is reduced, so as to define a gap 24 of predetermined width between this reduced radius portion 13D' and the inner cylindrical surface of the output disk 2.

This gap 24 prevents distortion of the output disk 2 due to pressure from the power rollers 3 being transmitted to the extended portion 13D of the output gear 13. Accordingly, the extended portion 13D does not undergo any deformation such as would impose a local load upon the radial bearing 8, and an environment for the radial bearing 8 is obtained in which it does not suffer undue wear.

The embodiments of this invention in which an exclusive property or privilege is claimed are defined as follows:

1. A toroidal type continuously variable transmission adapted to be interposed between an input shaft and a drive shaft for transmitting a rotation of said input shaft to said drive shaft at any rotational speed ratio within a continuous range, comprising:

an input disk supported on said input shaft so as to rotate together with said input shaft, an output disk supported on said input shaft so as to be free to rotate on said input shaft, a toroidal cavity formed in confronting faces of said input and output disks, a roller member fitted into said toroidal cavity and having a part spherical rolling surface, means for mutually biasing together said input disk and said output disk so as to contact both of said confronting faces against said part spherical rolling surface of said roller member and to support said roller member within said toroidal cavity;

a first output gear disposed on the other side of said output disk from said input disk and coupled to said output disk;

a second output gear meshed with said first output gear for transmitting driving force to said drive shaft;

an angular bearing disposed on the other side of said first output gear from said output disk and supporting a thrust load and a radial load imposed upon an assembly of said output disk and said first output gear; and a radial bearing provided between an inner circumference of said first output gear and said input shaft for supporting a radial load imposed upon said assembly, a central position of said radial bearing being located between a central position of said angular bearing and a central position of said first output gear along a central axis of said input shaft.

2. A toroidal type continuously variable transmission as defined in claim 1, wherein the location of said radial bearing along the input shaft is defined by the following relations:

a<c and b<c a=$\overline{RQ}$, b=$\overline{PR}$, c=$\overline{PQ}$ where P is a point of intersection between a line of operation of a support force of said angular bearing based upon an angle of contact θ of said angular bearing and a central axis of said input shaft, R is a point of intersection between a line of operation of the radial load imposed upon said first output gear and the central axis of said input shaft, and Q is a point of intersection between a line of operation of a support force of said radial bearing and the central axis of said input shaft.

3. A toroidal type continuously variable transmission as defined in claim 1, further comprising means for preventing said radial bearing from dropping out from said first output gear.

4. A toroidal type continuously variable transmission adapted to be interposed between an input shaft and a drive shaft for transmitting a rotation of said input shaft to said drive shaft at any rotational speed ratio within a continuous range, comprising:

an input disk supported on said input shaft so as to rotate together with said input shaft, an output disk supported on said input shaft so as to be free to rotate on said input shaft, a toroidal cavity formed in confronting faces of said input and output disks, a roller member fitted into said toroidal cavity and having a part spherical rolling surface, means for mutually biasing together said input disk and said output disk so as to contact both of said confronting faces against said part spherical rolling surface of said roller member and to support said roller member within said toroidal cavity;

a first output gear disposed on the other side of said output disk from said input disk and coupled to said output disk, said first output gear comprises a hollow shaft which protrudes in a direction of said input disk and penetrates through said output disk, a second output gear meshed with said first output gear for transmitting driving force to said drive shaft;

an angular bearing disposed on the other side of said first output gear from said output disk and supporting a thrust load and a radial load imposed upon an assembly of said output disk and said first output gear; and a radial bearing disposed between said input shaft and an inner circumference of an end portion of said hollow shaft which penetrates through said output disk, for supporting a radial load imposed upon said assembly.

5. A toroidal type continuously variable transmission as defined in claim 4, wherein a gap is present between said hollow shaft and an inner circumference of said output disk.

6. A toroidal type continuously variable transmission as defined in claim 5, further comprising means for preventing said radial bearing from dropping out from said first output gear.

7. A toroidal type continuously variable transmission as defined in claim 4, wherein a gap is present between said hollow shaft and an inner circumference of said output disk.

8. A toroidal type continuously variable transmission as defined in claim 4, further comprising means for preventing said radial bearing from dropping out of said first output gear.

* * * * *